(No Model.)
E. C. TRISLER.
GATHERING ATTACHMENT FOR LAWN MOWERS.
No. 601,008. Patented Mar. 22, 1898.
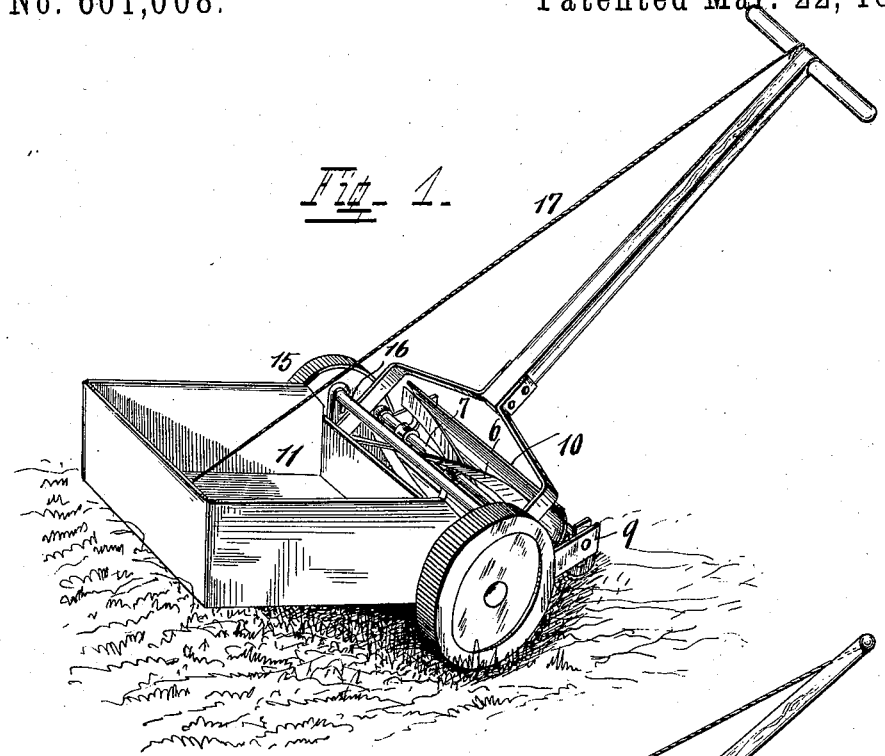
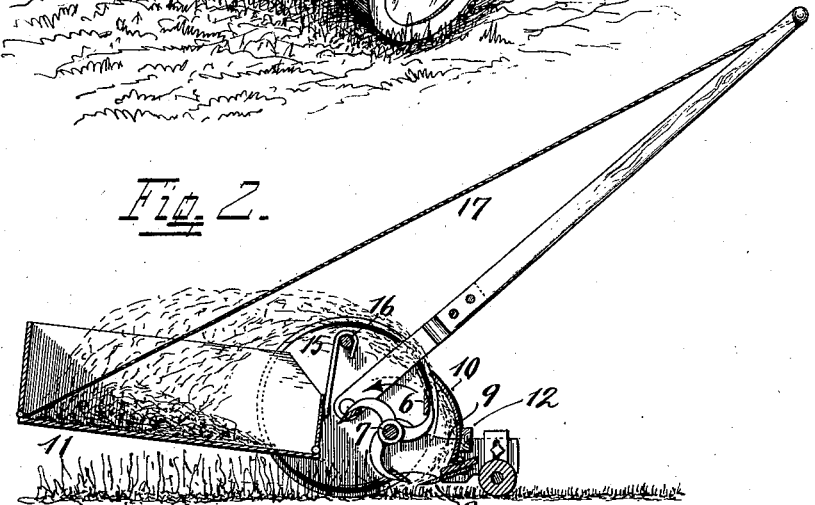
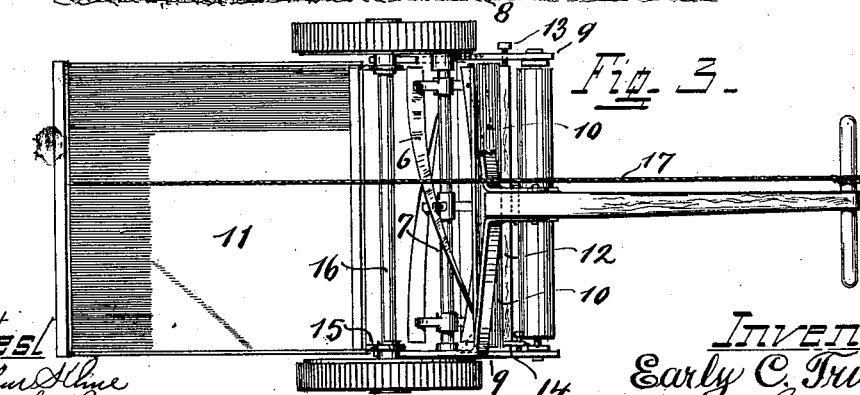
Attest:
Arthur A. Kline
John C. Rogers
Inventor
Early C. Trisler
by C. Spengel Atty

UNITED STATES PATENT OFFICE.

EARLY C. TRISLER, OF HOME CITY, OHIO.

GATHERING ATTACHMENT FOR LAWN-MOWERS.

SPECIFICATION forming part of Letters Patent No. 601,008, dated March 22, 1898.

Application filed January 28, 1897. Serial No. 621,008. (No model.)

*To all whom it may concern:*

Be it known that I, EARLY C. TRISLER, a citizen of the United States, and a resident of Home City, Hamilton county, State of Ohio, have invented certain new and useful Improvements in Gathering Attachments for Lawn-Mowers; and I do declare the following to be a clear, full, and exact description of the invention, such as will enable others skilled in the art to which it appertains to make and use the same, attention being called to the accompanying drawings, with the reference-numerals marked thereon, which form a part of this specification.

This invention relates to improvements in attachments to lawn-mowers for the purpose of gathering up and receiving the grass immediately as it is cut. They consist, usually, of two parts, of which one elevates the grass directly after it is cut and delivers it into the receiver, and the other part is the receiver itself. Their purpose is to obviate the necessity of gathering and removing the grass after it is cut, thus lessening time and labor by combining the operations of cutting and collecting, which operations are now in most cases performed separately.

My improvements have for their object to strengthen the construction and provide a better method of attachment of the parts, permitting the invention to be readily applied to existing lawn-mowers.

In the following specification, and particularly pointed out in the claim, is found a full description of the invention, its operation, parts, and construction, which latter is also illustrated in the accompanying drawings, in which—

Figure 1 shows in a perspective view a lawn-mower with all parts of the attachment in position and ready for use. Fig. 2 is a vertical longitudinal section of Fig. 1, and Fig. 3 is a top view of the mower.

In the drawings, 6 indicates the rotating knives, of well-known form and mounted upon the driving-shaft 7, whereby they are operated. They cut against the stationary knife 8, which is supported in a suitable manner on or between rearwardly-extending brackets 9, which form part of the machine-frame. That part whereby the grass is elevated consists of a curved guide-wall 10, which stretches across the space between brackets 9 and from one side to the other back of the rotating knives 6 and with its lower end at a height about even with the stationary knife. This wall 10 is curved on a line which follows parallel or concentrically for some distance the path of rotation of knives 6, but with a space between it and such line of path. The effect to which is due the elevation of the grass is the result of the combined action of two forces which operate, first, mechanically, whereby the grass immediately after cut is thrown against the concave wall 10, on which, by reason of the impetus received from the rotating cutting-knives, it slides upwardly, changing thereby the direction of its motion in a manner to have assumed, when leaving the space between these latter and wall 10 at the upper end, a forward direction, which causes it to be deposited in the grass-receptacle 11. This mechanical action is augmented by the second force referred to above and which force is generated by the air which is set in motion by the rotation of the knives and creates a suction in the space between said knives and wall 10. The action of these forces is gaged by the distance of wall 10 from the path of rotation of the knives, as well as by the location of its upper edge, all of which are such as to deliver the cut grass properly within the limits of the receiver, neither throwing it too short nor beyond. In practice wall 10 is usually constructed of sheet metal which is bent to the curve shown.

If light metal is used, it is necessary to stiffen the wall, which I do by a rib 12, made of wood. The manner of holding it in position is more or less dependent on the style and shape of the particular lawn-mower and its frame. My aim is, however, to provide a construction which permits connection of the attachment to most any existing lawn-mower, for which purpose I provide a set-screw 13, which is readily adjusted and, being seated in one of brackets 9, bears endwise against rib 12 or, being carried in a lug 14, bears against one of brackets 9.

The receiver 11 is a box-shaped structure with its end nearest the mower partly open and provided thereat with hooks 15, whereby it is hung on the customary upper tie-rod 16, found in most lawn-mowers. Its farther end is kept elevated at the proper height by a cord 17, which is fastened to the handle of the lawn-mower, and by which cord the height of said end and the inclination of the receiver may also be adjusted. Light material for the receiver is suggested, and wicker-work or a wire frame covered by canvas may be used.

Having described my invention, I claim as new—

A grass-elevating attachment for lawn-mowers consisting of the curved wall 10, a rib 12 on it, a lug 14 projecting therefrom and a set-screw supported in said lug whereby the attachment is secured between the side frames of a lawn-mower back of the rotating knives thereof.

In testimony whereof I hereunto affix my signature in presence of two witnesses.

EARLY C. TRISLER.

Witnesses:
ARTHUR KLINE,
C. SPENGEL.